May 22, 1973

C. J. ALBRIGHT 3,734,744

METHOD FOR PRESSURIZED COOKING OF FOOD IN
HIGH-TEMPERATURE NON-AQUEOUS LIQUID

Original Filed Aug. 8, 1968

INVENTOR:
CHARLES JERE ALBRIGHT
BY
Edwin Phelps
ATT'Y

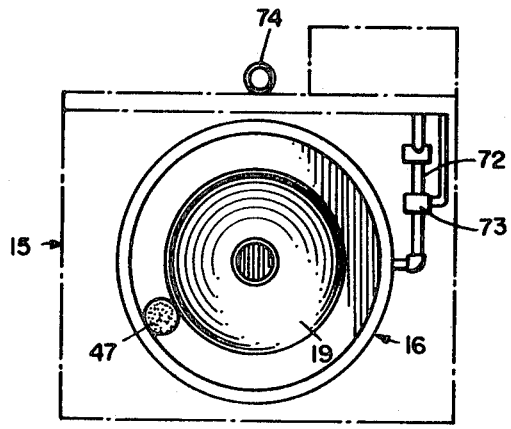
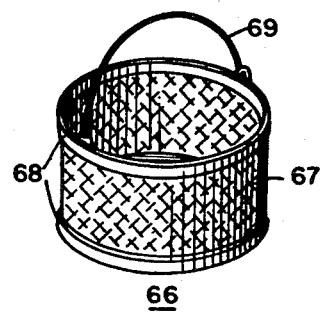
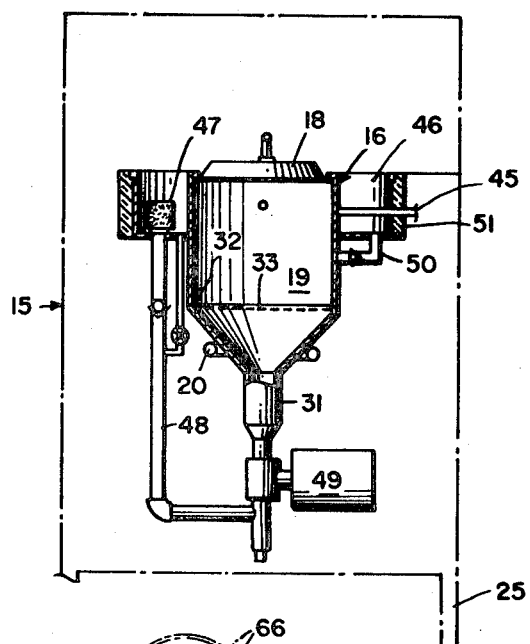
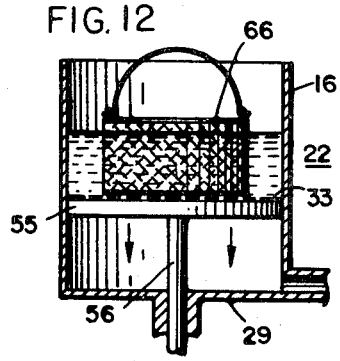
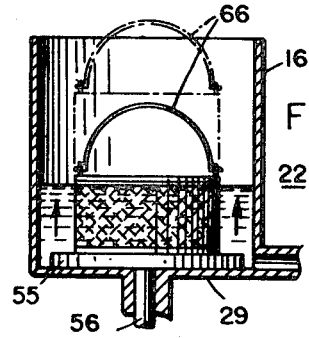

FIG. 7

| | OPERATIONS | CYCLE-MINUTES 0 1 2 3 4 5 6 7 8 9 10 11 12 |
|---|---|---|
| MAKE READY | TURN ON POWER SWITCH | |
| | POUR IN COOKING LIQUID | |
| | CLOSE SW. 65 TO HEATER 20 FOR HEATING THE LIQUID | |
| COOK | INSERT FOOD | |
| | CLOSE LID; CLOSE SW. 60 & 61 TEMP. & PRESSURE INDICATORS OPER. | |
| | SET TIMER 59 TO EFFECT COOKING OPERATION | (QUANTITY OF FOOD) |
| | TIMER OFF; VALVE 52 OPENS LIQUID PRESSURED TO CONTAINER | |
| REMOVE FOOD | WITHDRAW CLOSURE LID; REMOVE FOOD | |
| | LIQUID RETURNS FROM CONTAINER TO RECEPTACLE | |
| CLEANSING | ACTUATE SW. 64 TO HOLD LIQUID IN CONTAINER | |
| | CLEANSE RECEPTACLE | |
| RESUME COOK | REACTIVATE SW. 64 RESUME OPERATIONS | (QUANTITY OF FOOD) |

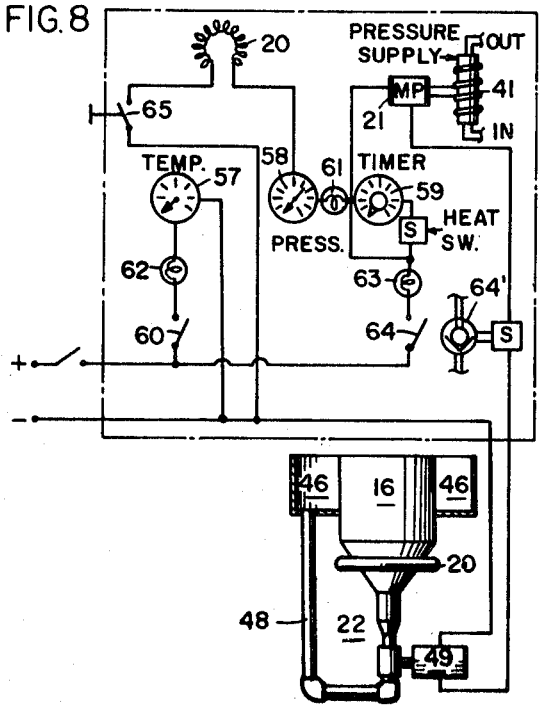

FIG. 8

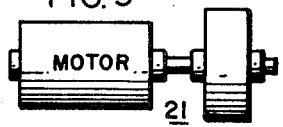

FIG. 9

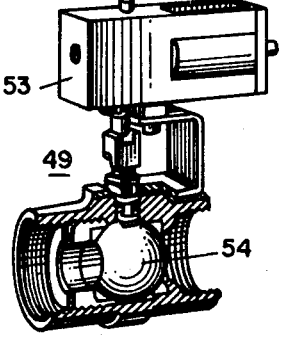

FIG. 11

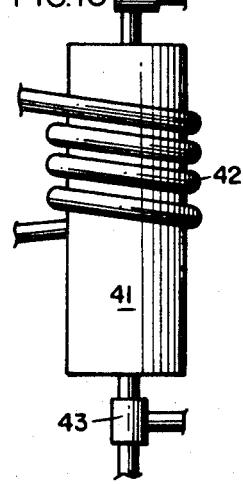

FIG. 10

*INVENTOR:*
CHARLES JERE ALBRIGHT
BY
*Edwin Phelps*
ATT'Y

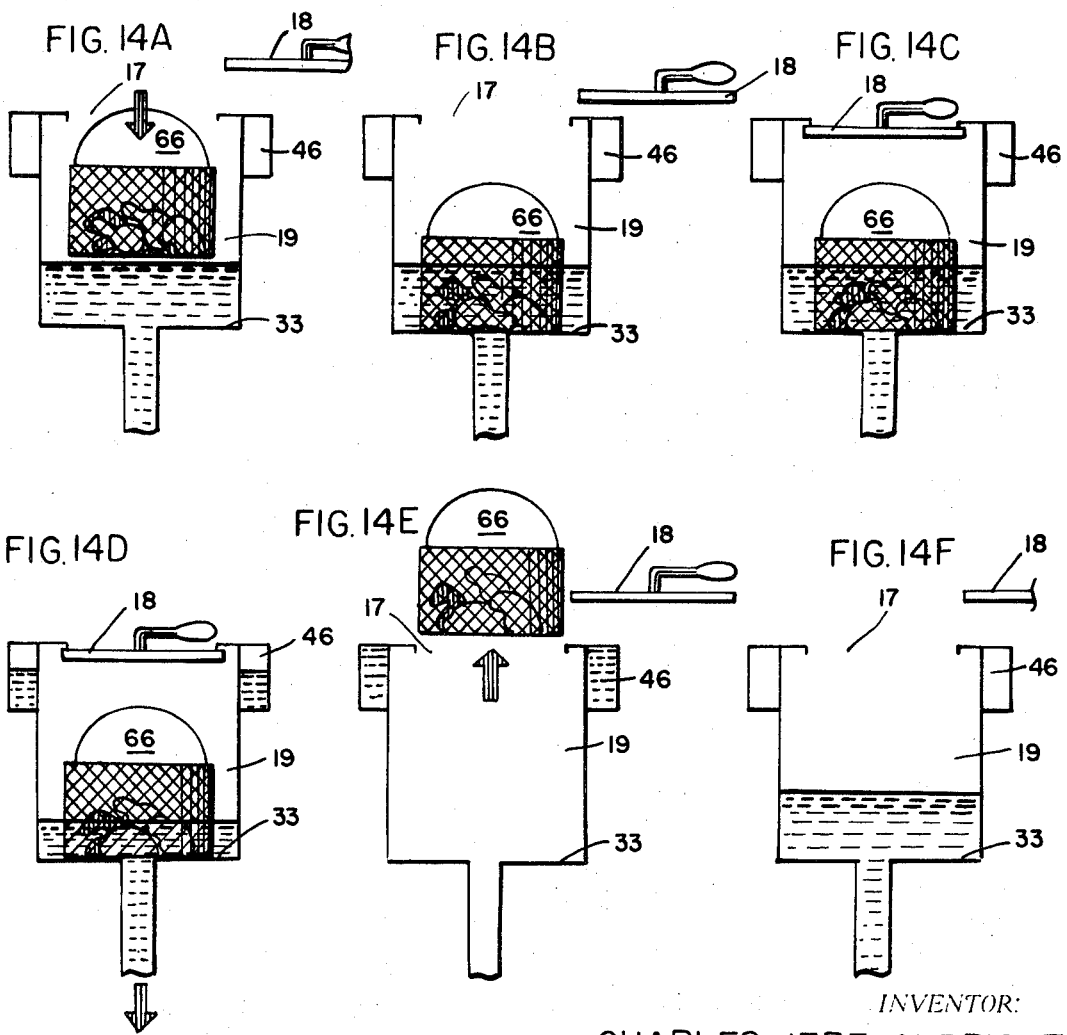

United States Patent Office 3,734,744
Patented May 22, 1973

3,734,744
METHOD FOR PRESSURIZED COOKING OF FOOD IN HIGH-TEMPERATURE NON-AQUEOUS LIQUID
Charles Jere Albright, 313 W. North Ave.,
Chicago, Ill. 60610
Continuation of abandoned application Ser. No. 751,127, Aug. 8, 1968. This application Dec. 14, 1970, Ser. No. 98,166
Int. Cl. A47j 37/12
U.S. Cl. 99—107                    21 Claims

ABSTRACT OF THE DISCLOSURE

A method for the pressurized cooking of foods in high-temperature, non-aqueous liquids for a time-controlled period in which a nearly-instant separation of the cooked foods and the hot liquid at the termination of each cooking period is effected so as to retain in the cooked food the juices inherent in the food.

This invention relates to the new structuring of equipment for a new method for cooking food in pressurized high-temperature non-aqueous liquids.

This is a continuation of application Ser. No. 751,127, filed Aug. 8, 1968, and now abandoned.

It is a well-known fact that the frying and/or baking of food—especially meat—requires a considerable period of time. During that time the natural juices, inherent in the food, are subjected to the high temperatures required for cooking the food. This converts these food-juices into steam which escapes into the ambient atmosphere. Such extraction of the juices lessens the taste appeal and the nutrient quality of the food.

A greatly lessened time-period for cooking food, especially meat, in pressurized, high-temperature, non-aqueous liquids has been the subject matter of a number of patents in recent years. Examples of such apparatus are shown in the Pats. No. 2,778,736; 2,827,379; 2,917,200; 2,918,861; 2,938,648; 2,964,215; and 3,232,267. Some of these have been in commercial use.

Such types of apparatus are used with the cooking chamber operating at temperatures ranging from 325 to 380 degrees Fahrenheit, with pressures ranging from 14 to 35 p.s.i., for cooking periods ranging from 6 to 12 minutes. The general optimum for these conditions are 35 p.s.i. at temperatures approximately 380 degrees. The time periods have to be determined by the size and nature of the food product being processed, and the desired resulting cooked condition of the foods.

In such apparatus, at the close of each cooking cycle, the cooking chamber has to have the pressure reduced to nearly normal ambient atmospheric conditions. This is imperative before opening the chamber for the removal of the food. Any attempt to obtain access to the chamber, before such reduction to pressure, very possibly could result in serious harm to the operator and/or the spraying of particles of hot liquid over the adjacent surfaces.

The disclosures of the above-noted patents inhere faults that have been characteristic of the food-cooking procedures antecedent to the appearance of these disclosures.

The most serious of these faults is that which characterizes the above-noted cooking of foods in facilities open to ambient atmosphere. This is inevitable since these disclosures generally provide for the gradual escape of the air above the hot liquid into the ambient air to a point where it clearly would be safe for the manual removal of the chamber closure. Hence, a minute or more has to elapse before the cooked food can be removed from the hot liquid. As a consequence a considerable portion of natural juices in the food are converted into steam. This escapes into the space above the hot liquid. Obviously, this adds, somewhat, to the pressure in the receptacle and tends to further delay the removal of the closure lid. More seriously, this delays the withdrawal of the food from the hot liquid. Thus, in these prior disclosures there, inevitably, occurs the condition which has been noted above with regard to the process of frying or baking food; namely, the loss of a portion of the natural food juices.

Another disadvantage of such apparatus, as shown and described in these patents, is that under continuous use over periods of time, the draining and filtering of the liquid has to be effected when the apparatus is not required for cooking. As a result particles released from the food tend to accumulate in the liquid during such extended cooking periods. These accumulations tend to lessen the cooking efficacy of the liquid over an extended period of time. Moreover, the overcooked particles from previously-processed food tend to cling to the later cooked food. The result is a reduced appeal of the later-cooked food.

The main objects of this invention, therefore, are; to provide an improved structuring of an apparatus for cooking foods in deep, high-heated liquids under pressure; to provide an improved form and positional arrangement of a closure-lid for sealing the cooking chamber and make for an instant removal thereof at the timed terminus of each cooking period; to provide an improved means for developing a controlled pressure in the cooking chamber above the hot liquid during each cooking period; to provide improved means for the nearly-instant separation of the cooked food and the hot liquid incident to the terminus of each timed cooking period; to provide improved means for filtering the hot-liquid during each separation of the cooked food and the hot liquid; to provide improved time-controlled means for effecting the nearly-instant reduction of pressure in the cooking chamber at the end of each timed cooking period; and to provide an improved structuring of an apparatus of this kind of such simple form and facile use as to make highly economical the manufacturing and marketing thereof and exceedingly gratifying and profitable the use thereof by purchasers.

In the adaptation shown in the accompanying drawings;

FIG. 4 is a perspective view of a type of caddy into which the food is placed subject to its being immersed in the hot liquid for cooking;

FIG. 5 is a somewhat diagrammatic, vertical sectional view illustrating the general arrangement of the various critical parts and instruments of the apparatus;

FIG. 6 is a top plan view of what is shown in FIG. 5;

FIG. 7 is a chart indicating the general, timed sequences for cooking food—especially meat—in this improved apparatus;

FIG. 8 is a schematic view of the circuitry and the various instruments involved in the operation of this apparatus incident to its use in cooking a batch of food;

FIG. 9 is a side view of a motor-pump unit capable of use in various ways for effecting the requisite pressure in the receptacle during the cooking operation;

FIG. 10 is a diagrammatic view of a type of unit suitable for introducing pressured fluids into the cooking receptacle;

FIG. 11 is a perspective-partly-sectional view of a valve mechanism which controls the hot liquid flow from the receptacle to a container, at terminus of each timed, cooking operation; and FIGS. 12 and 13 are diagrammatic views showing two other possible adaptations for effecting the nearly-instant separation of the cooked food from the hot liquid at the conclusion of each timed cooking period.

FIGS. 14A through 14E illustrate the major successive steps in this improved method for pressurized cooking of food in high-temperature non-aqueous liquids in the herein-described structure.

Figure 1:
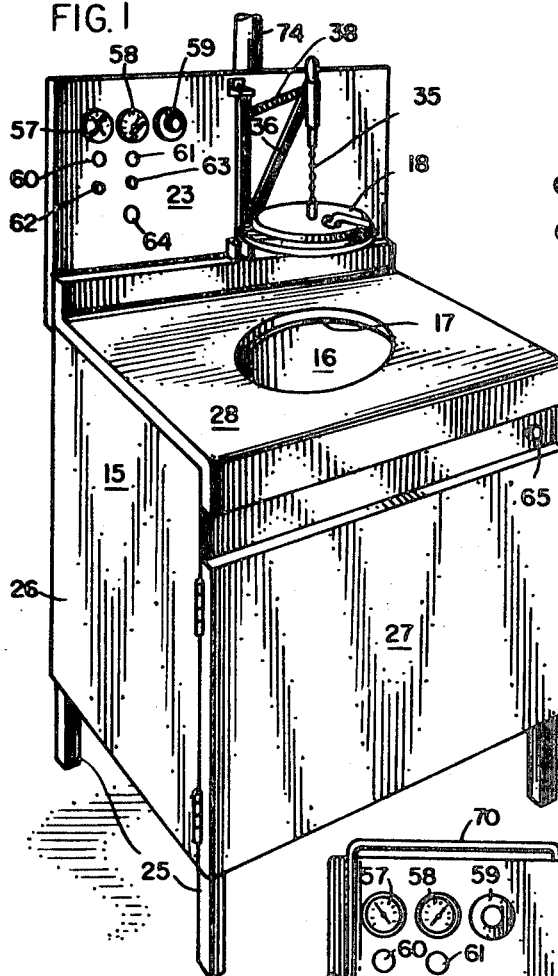
FIG. 1 is a front perspective view of a cabinet-enclosed food-cooking apparatus embodying the hereinbefore-stated concept; with the closure-lid, for the cooking receptacle, suspended above the cabinet.

An apparatus embodying the foregoing concept comprises a cabinet 15 wherein is suspended a food-cooking receptacle 16 having a food-inserting and withdrawal opening 17, a closure-lid 18 for sealing the cooking chamber 19, an element 20 for heating the liquid in the receptacle 16, a motor-pump-unit 21 operable for effecting pressure in the receptacle 16 during the cooking operation, a facility 22 for separating each batch of cooked food from the hot liquid before the opening of the receptacle to obtain access to the cooked food, and having an instrument panel 23 whereon are arranged the several devices for effecting the manual and automatic functioning of the apparatus.

The cabinet 15, as herein shown, involves a framework of angle-bars 25 mounting fixed side panels 26, a hinged front door 27 and a hinged top 28.

The food-cooking receptacle 16 is a fairly-heavy metal cylinder wherein the opening 17 is defined by a narrow, inwardly-disposed rim 30, the full nature and function of which is set forth in a co-pending application Ser. No. 791,728 now abandoned. As hereinshown the bottom 29 of the cylindrical receptacle is frustum shaped leading to a restricted tubular outlet 31 to the facility 22. Obviously, such a shaped and dimensioned bottom 29 is not critical. However, it does provide a ledge 32 in the receptacle 16 whereon may rest a removable, perforate tray 33 the function of which will be explained presently.

The closure-lid 18 is a very significant and critical feature of this development for ensuring a facile and firm sealing of the cooking chamber 19. As hereinshown it is one of two adaptations which are illustrated, explained and claimed in the above-noted co-pending application Ser. No. 791,728. The significance of such a closure-lid 18 is due to the fact that it is positionable in use-position within the receptacle 16, below the rim 30 and held in place by the pressure in the cooking chamber 19, to seal the opening 17 during the cooking operation.

Such a closure-lid 18, of course, could be used with the cooking receptacle 16 without any attachment of the closure-lid 18 to the receptacle cabinet 15, as shown in FIG. 1. However, for use with the greatest possible ease, the closure-lid is shown suspended on a chord or chain 35 from an arm 36 hinged to a bracket 37 swingably anchored to the instrument panel 23. A spring 38 spans the upward ends of the arm 36 and bracket 37. This spring 38 normally elevates the closure-lid 18 into a position above the cabinet 15 and permits its swinging off to one side of the opening 17 to the cooking receptacle 16. Hence, the closure-lid 18 usually is in a retracted position such as does not interfere with the insertion of the food into and its removal from the cooking receptacle 16.

Figure 3:
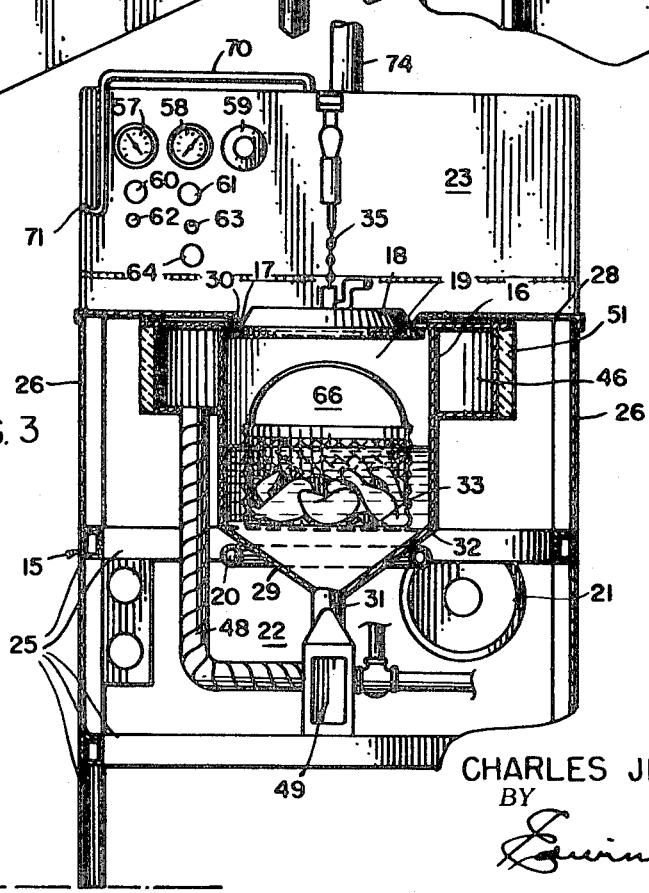
FIG. 3 is a cross-sectional view taken on the plane of the line 3—3 of FIG. 2, and showing the general form of the cooking receptacle in use operation.

The heating element 20 may be either electrical or gas-fired. As shown herein, it is in the nature of a ring positioned directly-around and below the bottom of the receptacle 16 (FIGS. 3 and 5). Its "on and off" functioning is co-ordinated with the use of the apparatus as controlled by the hereinafter-explained fixtures on the instrument panel 23.

The motor-pump unit 21 (FIGS. 3 and 9) involves a conventional low-voltage electric motor. The form of the pump depends upon the nature of the fluid that is preferred for enhancing the pressure in the cooking chamber 19. Such a fluid may be water, steam, ambient air, compressed air, or an artificial gas, such as nitrogen.

Whatever fluid may be employed, for pressurizing the chamber 19 during each cooking process, it has to be injected into the cooking chamber 19 through an acceptable medium. An exemplary medium is illustrated in FIG. 10. As therein shown this involves a cylinder 41 with a heating coil 42, a fluid-inlet nipple 43 and a fluid-discharge nozzle 44.

The dimension of the cylinder 41 would be determined by the size of the cooking receptacle 16. The T-shaped nipple 43 permits a connection to two different types of fluid, e.g. water or gas. Obviously, each such branch of the nipple 43 would incorporate a flow-control valve. One such branch could be connected to a water supply. The other branch could be connected to a suitable source of air or gas.

The heating coil 42 could be connected to a suitable source of electricity incorporating a controlling switch. Such a coil 42 would be available for use in converting water into steam in the cylinder 41 or warming the air or gas for injection into the chamber 19.

Whatever the type of fluid, employed to increase the pressure in the cooking chamber 19, it would be injected into the cooking chamber 19 by the motor-pump unit 21 through a tube 45 (FIG. 5) leading to the receptacle cooking chamber 19.

The facility 22, for effecting the separation of the cooked-food from the hot liquid incident to each timed-cooking period, is one of two of the most significant features of this development of a food-cooking apparatus. This facility effects a separation of each batch of cooked food from the hot liquid before the opening of the receptacle 16 to withdraw the food. The full significance of such a facility will be explained in a latter portion of the specification. Such a facility may take any of several forms. A tentatively preferred type of such a facility is shown in FIGS. 3, 5 and 11. Another special type is diagrammatically illustrated in FIGS. 12 and 13.

This facility 22, of FIGS. 3 and 5, involves a container 46 with which is associated a filter 47, a liquid-flow conduit 42 connecting the receptacle outlet 31 to the container 46 and having a liquid-control mechanism 49 for regulating the passage of hot liquid from the receptacle 16 to the container 46 subject to its return flow through the port 50 back to the receptacle 16.

As herein shown, the conatiner 46 is embracively positioned on the receptacle 16 an appropriate distance above the bottom of the cooking chamber 19. A layer of insulation 51 embraces the cylinder 41 to reduce as much as possible the loss of heat from the hot liquid during its brief transfer from and return to the cooking chamber 19. Obviously, the container 46 could be placed elsewhere. However, there are advantages in having the container 46 so juxtaposed to the receptacle 16 so as to avoid as little heat loss as possible from the hot liquid during this transfer.

The filter 47 is shown arranged in the container 46. It is indicated as of cylindrical form attached to the discharge end of the conduit 48. Other filter structures could be used. If there were advantages for doing so, the filter 47 could be associated with the liquid return-flow to the port 50 that leads back into the receptacle 16.

As most clearly shown in FIG. 5 such a liquid-flow conduit 48 leads from the receptacle outlet 31 upwardly along the receptacle 16 and into the under side of the container 46. The flow of the hot liquid from the receptacle 16 through the conduit 48 to the container 46 is controlled by the liquid-control mechanism 49 as shown in FIG. 11. Such a mechanism is provided by the Ramcon Corporation. A motor 53 alternates the positioning of a channeled ball 54 to cut off or permit the flow of the hot liquid through the conduit 48 as determined by the time-controlled circuitry shown in FIG. 8, as hereinafter explained.

The alternate facilities 22, shown in FIGS. 12 and 13, each involve a disk 55 reciprocably mounted in a receptacle 16. A connecting rod 56 extends outwardly of the receptacle 16 for connection to an actuating motor-unit (not shown). In the instance of FIG. 12 the disk 55 is in the nature of a piston and the food is supported on apertured tray 33 during the cooking period. In the instance of FIG. 13 the food is supported on the disk 55. As will be explained later, the hereinafter-described timer will effect the operation of a motor unit to lower or raise the respective disks to separate the cooked food from the hot liquid.

Figure 2:
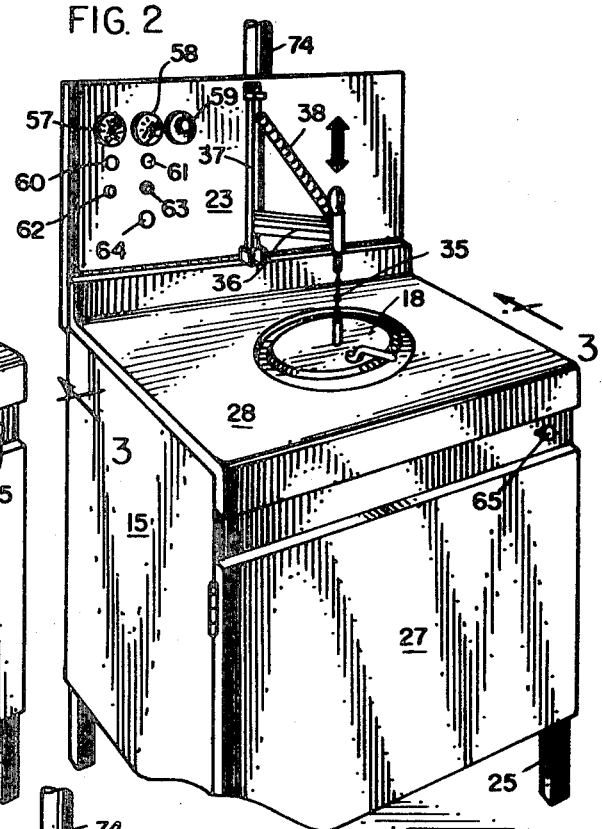
FIG. 2 is a view similar to that of FIG. 1 but showing the closure-lid in its locked, in-use position over the open end of the cooking receptable.

The instrument panel 23 extends upwardly above the cabinet 15 along the rear thereof. Here are mounted all but one of the several instruments which control the operation of the apparatus. These instruments include a temperature gage 57, a pressure indicator 58, a timer 59, switch-actuating buttons 60 and 61, coordinated with light signals 62 and 63, and a switch-actuating button 64 for temporarily holding the return of the hot liquid from the container 46 to the receptacle 16. The one instrument not on the panel 23 is the main circuit-closing switch-button 65 arranged at the right front corner of the cabinet 15 (FIGS. 1 and 2).

As shown in FIGS. 3, 4, 12 and 13, the food to be cooked is placed in a kind of caddy 66 for immersing the food in the hot liquid in the receptacle 16. As most clearly shown in FIG. 4 this caddy 66 is formed with a wire-mesh cylinder 67 secured to a pair of axially-spaced stable rings 68, with a bail 69 hinged to the upper of these rings. When this caddy 66 is withdrawn from the receptacle 16 it is desirable to permit any remnant of the hot liquid, that might possibly be adhering to any of the pieces of food, to be drained back into the receptacle 16. For such purposes, when needed, an L-shaped rod 70 with a hooked end 71 (FIG. 3) is swivelled on the upper rim of the instrument panel 23 for swinging into and out of position over the opening 17, when the caddy 66 is first withdrawn from the receptacle 16.

The operation of the herein-described apparatus may depend somewhat on the damands for the type of food product to be cooked therein. In general, however, the procedure would be more or less as indicated in the chart shown in FIG. 7.

Assuming that the appropriate cooking liquid, in the proper type and quantity, has been placed in the receptacle 16 the conventional power switch (FIG. 8) would be closed, as also the cabinet switch 65. As soon as the liquid has been heated to the desired temperature—indicated by the temperature gage 57—the apparatus is ready for use.

A caddy 66 is lowered into the hot liquid in the cooking chamber 19. The food may be arranged previously in the caddy or subsequently therein. The closure-lid 18 is set in place to seal off the opening 17.

A general method of using this apparatus is diagrammed in the series of FIGS. 14A through 14F.

FIG. 14A shows the caddy 66, with the food previously arranged therein, being lowered into the receptacle 16 for immersion of the food in the hot liquid;

FIG. 14B shows the caddy, with the food therein, resting on the tray 33, ready for the sealing of the receptacle opening 17 by the placing of the closure-lid 18;

FIG. 14C shows the closure-lid 18 being placed in position to seal off the cooking chamber 19 and permit the initiation of the food-cooking process;

FIG. 14D illustrates the beginning of the pressured transfer of the hot liquid from the chamber 19 into the container 46;

FIG. 14E illustrates the completion of the pressured transfer of the hot liquid to the container 46 to permit the removal of the closure-lid 18 and the immediate lifting of the caddy of cooked food from the chamber 19; and FIG. 14F illustrates the return of the hot liquid from the container 46 to the chamber 19 and ready for the immersion of another batch of food.

Under conditions that require a speedy, continuous, successive cooking of food, the afore-series of operation can be repeated every 6 to 12 minutes, depending upon the quantity of food that requires cooking each time.

As FIG. 14B, shows, the food becomes immersed instantly in this high temperature liquid—325 to 380 degrees Fahrenheit. Therefore, it is pertinent to note here that the food placed in the caddy—especially meats taken from the refrigerator—have some moisture on and directly inward of the surface. Thus the sudden immersion of the food into the hot liquid results in the conversion of that moisture into a bit of steam, rising above the hot liquid. On occasion such production of steam in the receptacle would be sufficient to complete the desired pressurized cooking of the food. On occasion when such is not the case, the closing of a switch to the herein-before-described motor-pump unit 21 will provide requisite pressure conditions in the receptable 16.

The timer 59 then is set for the required cooking period. This latter will depend upon the quantity of food placed in the caddy 66. Thereupon the cooking proceeds.

At the instant the timer 59 cuts off the current there is an immediate separation of the cooked food and the hot liquid. This separation is initiated by the concurrent actuation of the motor 53 of the liquid-control mechanism 49 (FIGS. 3 and 11). This turns the ball 54 to release the pressurized liquid in the receptable 16 to pass down out from the receptacle 16 and up through the conduit 48 into the container 46. Within a very few seconds the pressure gage 59 indicates such a reduction in pressure in the receptacle as to permit the removal of the closure-lid 18. In those few seconds a very significant, and never-before-achieved condition of the food has been attained. *The natural water-juices have been heated but the major portion of these remain in the cooked food.*

This is accounted for by the reason that during the time-controlled cooking period the pressure in the receptacle 16 elevates the boiling point of the water-juices in the food. As the temperature rises gradually in the food, due to its immersion in the hot liquid during the pressurized cooking, the increased boiling point retards substantial conversion into steam of the water juices.

The maximum temperature of these food water-juices is reached at the end of the cooking period. In these few final seconds of cooking the hot liquid is entirely withdrawn from the food in the caddy 66, thereby preventing the food water-juices from conversion into steam as the pressure in the receptacle is released. This precludes the conversion of any substantial portion of such juices into steam during this pressurized cooking operation. Thus, within the space of a very few seconds, the closure-lid 18 may be removed and the caddy 66 of cooked food may be lifted from the receptacle.

Another significant feature of this disclosure also has taken place concurrently with the withdrawal of the hot liquid from the receptacle 16. *The liquid has been filtered.* Hence, with the removal of the closure-lid 18, the still-hot liquid, as clear and fresh as when it was first heated in the receptacle 16, is released to return to the receptacle for a subsequent food-cooking operation.

Obviously, sanitation factors require the receptacle 16 to be washed out frequently. With the apparatus of the hereinbefore listed patents, this has had to be done when there was no great demand for the use of the equipment. With this disclosure, such cleansing of the receptacle 16 can be achieved in two or three minutes between successive cooking periods. It requires only the pressing of the switch button 64, on the instrument panel 23. That results in holding closed the normally-automatic one-way check valve 49 while an attendant quickly and thoroughly cleanses the receptacle 16 ready for a continued use.

The time chart of FIG. 7 visualizes the above-explained small time-elements for, (1) the easy "make-ready" of the apparatus for use,
(2) the speedy cooking of the food in the receptacle,
(3) the nearly-instant separation of the hot liquid from the cooked food,
(4) the quick removal of the cooked food from the receptacle, and
(5) the occasional facile cleansing of the receptacle during regular use of the apparatus.

Variations and modifications in the details of structure and arrangement of the parts may be resorted to within the spirit and coverage of the appended claims.

What is claimed is:

1. The improved method of cooking food in a pressurized, closure-lid, sealed receptacle containing a hot non-aqueous liquid, which involves placing the food in the receptacle, sealing the receptacle and effecting pressure therein, setting a pre-timed period of cooking, separating the hot liquid from the cooked food in the pressurized receptacle by lowering the liquid at the end of the cooking period, releasing the seal, and removing the food from the receptacle.

2. The improved method of cooking food as set forth in claim 1, which involves effecting a predetermined pressure and temperature in the receptacle during the cooking period.

3. The improved method of cooking food as set forth in claim 2, wherein the temperature of the liquid is maintained in excess of 300 degrees Fahrenheit.

4. The improved method of cooking food as set forth in claim 1, wherein the liquid is filtered in the course of each separation of the food and the liquid before the release of the seal.

5. The improved method of cooking food as set forth in claim 1, wherein the hot-liquid is withdrawn from the receptacle before the release of the seal.

6. The improved method of cooking food as set forth in claim 5, wherein the liquid during the separation from the food is retained against return to the receptacle to permit the cleansing of the receptacle.

7. The improved method of cooking food as set forth in claim 1, which involves positioning a closure-lid within the receptacle to seal the receptacle by the internal pressure on the closure-lid during the cooking period.

8. The improved method of cooking food in a pressurized open-top receptacle containing a non-aqueous liquid, which involves maintaining the temperature of the liquid above 300 degrees Fahrenheit during the cooking period, immersing the food in the liquid in the receptacle, sealing the receptacle opening by positioning a closure over the open top to be retained in sealed position by a pre-timed pressure in the receptacle during the food-cooking period, controlling the cooking period, effecting a temporary withdrawal of the liquid from the receptacle at the end of the cooking period to preclude the conversion into steam any substantial portion of the water-liquid food juices, retracting the closure-lid, withdrawing the food from the receptacle, releasing the liquid for return to the receptacle.

9. The improved method of cooking food as set forth in claim 8, which involves filtering the liquid during the withdrawal from the receptacle.

10. The improved method of cooking food as set forth in claim 9, wherein the liquid when withdrawn from the receptacle is retained temporarily against return to the receptacle to permit cleansing of the receptacle.

11. The method of cooking food immersed in hot non-aqueous liquid under pressure within a receptacle comprising, pressurizing the receptacle during cooking, maintaining the liquid over the food for the cooking period, separating the liquid from the food by lowering the liquid while the receptacle is pressurized, and removing the food from the receptacle.

12. The method as set forth in claim 11, wherein the liquid is removed from the receptacle when separating the liquid from the food.

13. The method as set forth in claim 12, wherein pressure is maintained within the receptacle during the removal of the liquid from the receptacle.

14. The method as set forth in claim 11, wherein the liquid is removed from the receptacle after separating the liquid from the food.

15. The method as set forth in claim 11, wherein the pressure is removed from the receptacle before removal of the food therefrom.

16. The method as set forth in claim 11, wherein pressure is maintained within the receptacle during the separation of the liquid from the food.

17. The method as set forth in claim 11, wherein pressure is reduced during the separation of the liquid from the food.

18. The method of cooking food in a pressurizable receptacle having a closable and sealable opening through which food is inserted therein comprising, supplying a hot non-aqueous liquid to the receptacle in an amount to cover the food, pressurizing the receptacle during cooking, supplying heat to the liquid and maintaining the temperature thereof for a period of time, separating the liquid from the food and lowering the liquid within the receptacle at the end of a period of time while the receptacle is pressurized, removing the closure and removing the cooked food.

19. The method as set forth in claim 18, wherein the pressure within the receptacle forces the separation of the liquid from the food.

20. The method as set forth in claim 18, wherein the pressure within the receptacle forces the liquid out of the receptacle.

21. The method as set forth in claim 18, wherein the liquid is filtered during the separation of the liquid from the food.

References Cited

UNITED STATES PATENTS

| | | |
|---|---|---|
| 2,532,639 | 12/1950 | Payne. |
| 3,187,664 | 6/1965 | Jennings. |
| 3,194,662 | 7/1965 | Nelson _____ 99—1 |
| 3,280,722 | 10/1966 | Rahauser. |
| 3,314,416 | 4/1967 | Wagner. |
| 3,364,845 | 1/1968 | Wilson et al. _____ 99—407 X |
| 3,431,835 | 3/1969 | Angold _____ 99—408 |

FRANK W. LUTTER, Primary Examiner

W. L. MENTLIK, Assistant Examiner

U.S. Cl. X.R.

99—326, 336, 407